(12) United States Patent
Mukai

(10) Patent No.: US 10,284,049 B2
(45) Date of Patent: May 7, 2019

(54) ELECTRIC MOTOR HAVING LABYRINTH

(71) Applicant: FANUC CORPORATION, Yamanashi (JP)

(72) Inventor: Yasuhito Mukai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/809,187

(22) Filed: Nov. 10, 2017

(65) Prior Publication Data

US 2018/0138774 A1 May 17, 2018

(30) Foreign Application Priority Data

Nov. 16, 2016 (JP) .................................. 2016-223016

(51) Int. Cl.
*H02K 5/10* (2006.01)
*H02K 7/08* (2006.01)
*H02K 5/173* (2006.01)
*H02K 7/14* (2006.01)

(52) U.S. Cl.
CPC .............. *H02K 5/10* (2013.01); *H02K 5/1732* (2013.01); *H02K 7/083* (2013.01); *H02K 7/14* (2013.01)

(58) Field of Classification Search
CPC ........ H02K 5/10; H02K 5/1732; H02K 7/083; H02K 7/14
USPC ....................... 310/52, 54, 62, 63, 64, 88, 89
See application file for complete search history.

(56) References Cited

U.S. PATENT DOCUMENTS

| 5,538,258 A | 7/1996 | Hager et al. |
| 2018/0183296 A1* | 6/2018 | Thalfah ................ H02K 5/1732 |
| 2018/0278117 A1* | 9/2018 | Katsuki ................... H02K 5/10 |

FOREIGN PATENT DOCUMENTS

| JP | 5392104 U | 7/1978 |
| JP | 6381649 U | 5/1988 |
| JP | 63105450 U | 7/1988 |
| JP | 9322465 A | 12/1997 |
| JP | 2005192363 A | 7/2005 |
| JP | 201022115 A | 1/2010 |
| JP | 2015223022 A | 12/2015 |
| JP | 2016183578 A | 10/2016 |

OTHER PUBLICATIONS

English Abstract and Machine Translation for Japanese Publication No. 2015-223022 A, published Dec. 10, 2015, 9 pgs.

(Continued)

*Primary Examiner* — Bernard Rojas
*Assistant Examiner* — Rashad H Johnson
(74) *Attorney, Agent, or Firm* — Fredrikson & Byron, P.A.

(57) ABSTRACT

An electric motor including a labyrinth having a function for preventing foreign particles from entering an inside of the motor. A labyrinth member having a generally annular shape is fixed to a portion of a rotation shaft positioned on a front side than a front bearing with respect to an axis, by interference fit, etc., and the labyrinth member is configured to rotate integrally with the rotation shaft. The labyrinth member has at least one first opening formed on a front surface of thereof, and at least one second opening formed on an outer lateral surface thereof. The first opening and the second opening are fluidly communicated with each other within the labyrinth member.

4 Claims, 3 Drawing Sheets

(56) References Cited

OTHER PUBLICATIONS

English Abstract and Machine Translation for Japanese Publication No. 2010-022115 A, published Jan. 28, 2010, 14 pgs.
English Abstract and Machine Translation for Japanese Publication No. 2005-192363 A, published Jul. 14, 2005, 9 pgs.
English Abstract and Machine Translation for Japanese Publication No. 09-322465 A, published Dec. 12, 1997, 6 pgs.
Untranslated Decision to Grant a Patent mailed by Japan Patent Office (JPO) for Application No. JP 2016-223016 dated Jul. 10, 2018, 3 pages.
English machine translation of Decision to Grant a Patent mailed by Japan Patent Office (JPO) for Application No. JP 2016-223016 dated Jul. 10, 2018, 3 pages.
Untranslated Notification of Reasons for Refusal mailed by Japan Patent Office (JPO) for Application No. JP 2016-223016 dated Feb. 27, 2018, 4 pages.
Translated Notification of Reasons for Refusal mailed by Japan Patent Office (JPO) for Application No. JP 2016-223016 dated Feb. 27, 2018, 3 pages.
English Machine Translation for Japanese Publication No. S63-105450 U, published Jul. 8, 1988, 2 pgs.
English Machine Translation for Japanese Publication No. S53-092104 U, published Jul. 27, 1978, 3 pgs.
English Abstract and Machine Translation for Japanese Publication No. 2016-183578 A, published Oct. 20, 2016, 21 pgs.
English Machine Translation for Japanese Publication No. S63-081649 U, published May 30, 1988, 2 pgs.

\* cited by examiner

ELECTRIC MOTOR HAVING LABYRINTH

BACKGROUND OF THE INVENTION

1. Field of the Invention

The present invention relates to an electric motor having a labyrinth structure.

2. Description of the Related Art

In some electric motors (or rotating electrical machines) having a stator and a rotor, a structure for preventing water or foreign material entering a clean area or the inside of the motor may be arranged. As a relevant prior art document, JP 2015-223022 A discloses an electric motor having an air-purging function. Concretely, this document describes that the electric motor has an air supply port for supplying pressurized air, and an air flow channel, which extends straight from the air supply port to a space around a bearing, and is communicated with a space for containing a winding wire.

JP H09-322465 A discloses an air guide/discharge unit including a fixed axis having a horizontal hole and a vertical hole so that air can enter the horizontal hole and flow out from the vertical hole, by which particles of lubricant or foreign material can be prevented from diffusing into a clean area.

Further, JP 2005-192363 A discloses an outer-rotor type motor including a hosing having a vent hole formed on an inner surface of the housing, in which foreign particles may be blown toward an outer peripheral of the motor due to a dynamic pressure in a groove of housing and a centrifugal force generated by the rotation of a rotor.

On the other hand, JP 2010-022115 A discloses an electric motor including a labyrinth section having a serpentine path, by which water can be prevented from entering an inside of the motor.

When the air-purging structure as described in JP 2015-223022 A is used, it is necessary to prepare a device or power for operating the structure, and thus the cost of the system including the structure may be increased. Further, a sealing function of the conventional labyrinth is often insufficient.

SUMMARY OF THE INVENTION

Thus, the object of the present invention is to provide an electric motor including a labyrinth having a function for preventing foreign particles from entering an inside of the motor, in comparison to the prior art.

Therefore, one aspect of the present invention provides an electric motor comprising: a stator; a rotor having a rotation shaft configured to rotate about an axis relative to the stator; a front bearing and a rear bearing configured to rotatably support the rotation axis; and a labyrinth member attached to at least one of: a portion of the rotation shaft positioned at a front side than the front bearing with respect to the axis; and a portion of the rotation shaft positioned at a rear side than the rear bearing with respect to the axis, wherein the labyrinth member has: at least one first opening formed on an end surface axially opposed to a surface facing an inside of the electric motor; and at least one second opening formed on an outer lateral side of the labyrinth member, the second opening being fluidly communicated with the first opening within the labyrinth member.

In a preferred embodiment, a plurality of the first openings are formed at regular intervals with respect to a circumferential direction about the axis, and a plurality of the second openings are formed at regular intervals with respect to the circumferential direction about the axis.

In a preferred embodiment, the number of the first openings is the same as the number of the second openings, and the second opening is positioned at the same circumferential angular position as the first opening.

In a preferred embodiment, the first opening is a tapped hole, and the second opening is a drilled hole.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
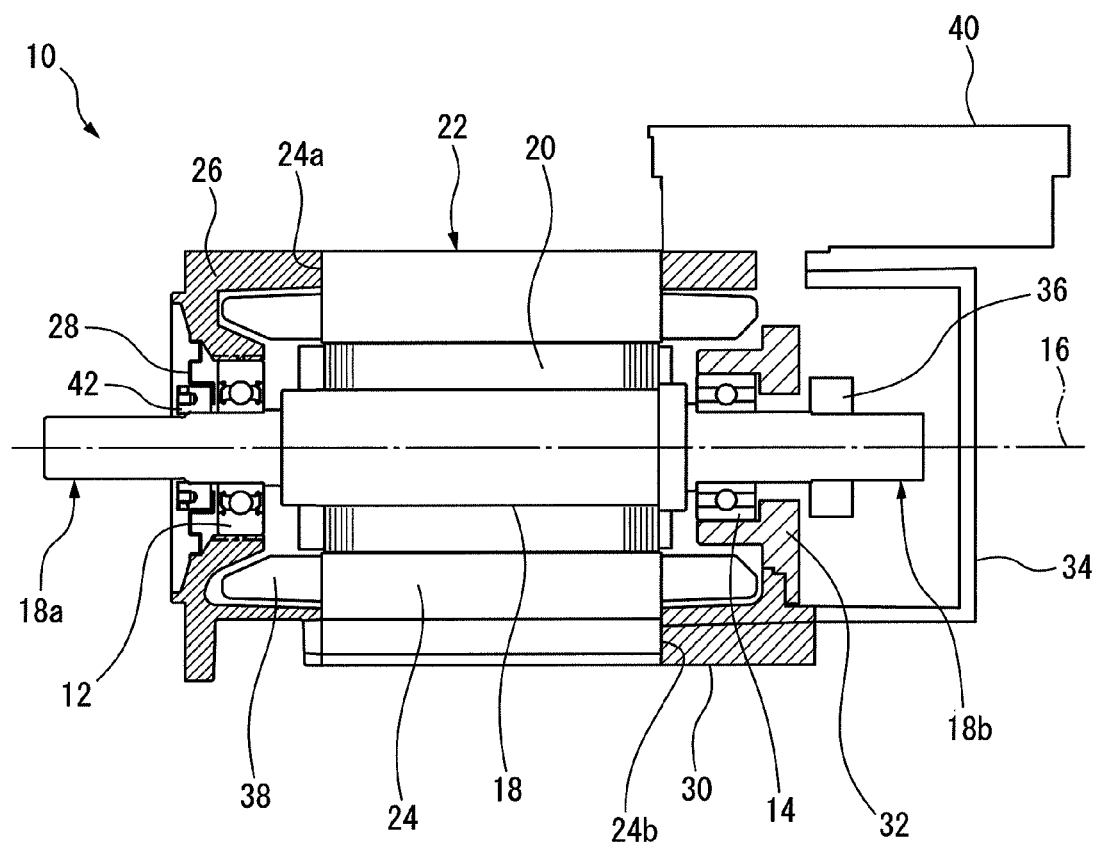
FIG. 1 shows a schematic configuration of an electric motor according to a preferred embodiment of the present invention.
Figure 2:
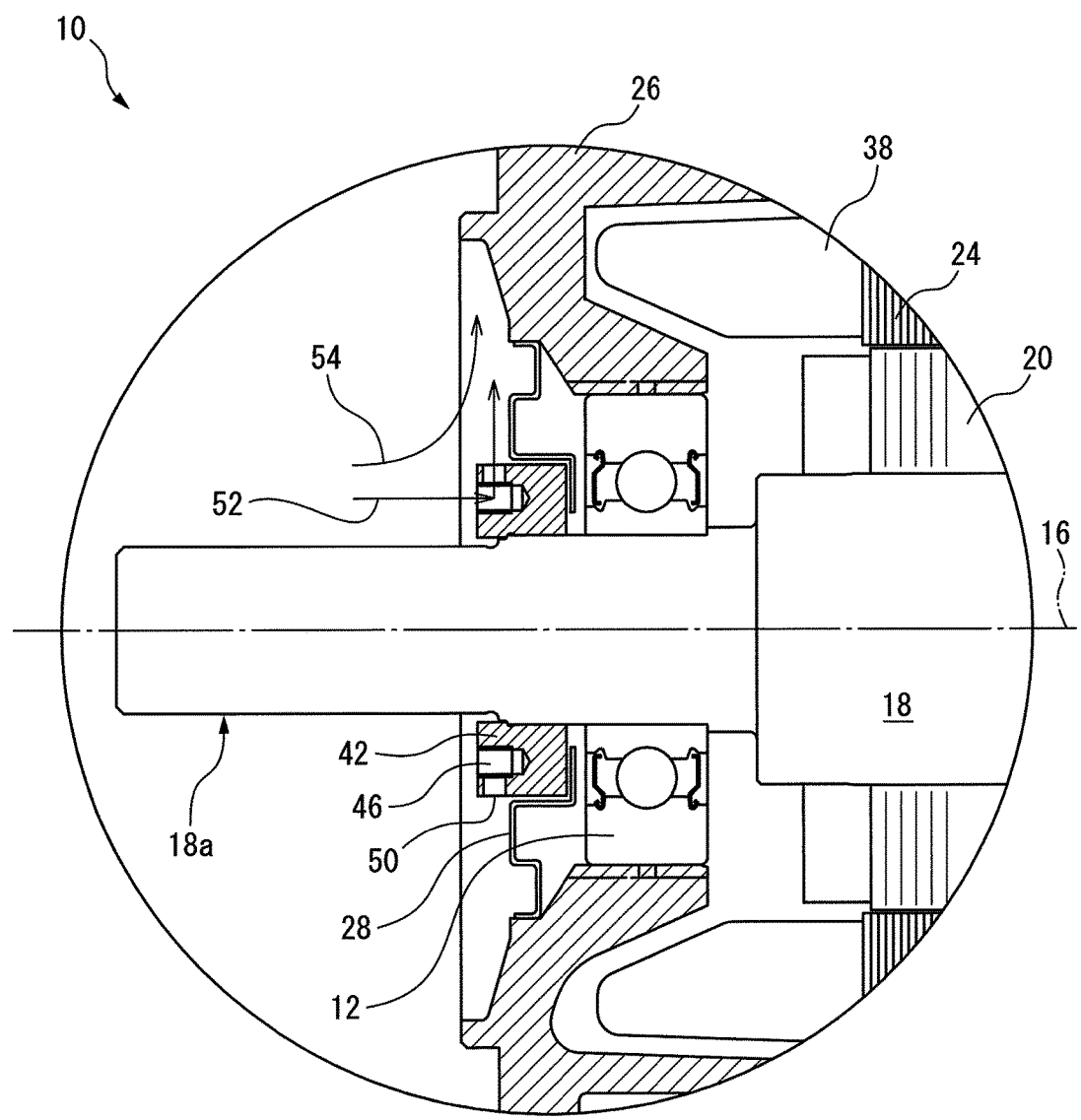
FIG. 2 is a partial enlarged view about au output axis of the electric motor of FIG. 1.

FIG. 1 is an axial cross-sectional view showing a schematic configuration of an electric motor (rotating machine) 10 according to a preferred embodiment of the present invention, and FIG. 2 is a partial enlarged view of a front section (about an output axis) of electric motor 10. Electric motor 10 has: a rotation shaft 18 supported by a first (front) bearing 12 and a second (rear) bearing 14 so as to rotate about an axis 16; a rotor 20 fitted with an outer peripheral surface of rotation shaft 18 and configured to rotate integrally with rotation shaft 18; and a stator 22 having a generally cylindrical shape extending along axis 16 so as to surround rotor 20.

Front bearing 12 is positioned near a front end 18a of rotation shaft 18, and is supported by a front housing 26 fixed to a front end surface 24a of a stator core 24 by using a screw, etc. Front housing 26 extends from front end surface 24a of a stator core 24 toward front end 18a of rotation shaft 18, and supports a part of rotation shaft 18 and (an outer race of) front bearing 12. A front cover 28 having a generally annular shape is attached to front housing 26. Front end 18a of rotation shaft 18 protrudes from front housing 26 and front cover 28, and rotation shaft 18 functions as an output axis. For example, the output axis may be directly or indirectly connected to a spindle of a machine tool, such as a lathe or a machining center, etc. Herein, for convenience, the output axis side (or the left side in FIG. 1) is referred to as the "front (side)," and the opposite side (or the right side in FIG. 1) is referred to as the "rear (side)."

Rear bearing 14 is positioned near a rear end 18b of rotation shaft 18, opposed to front end 18a of rotation shaft 18. A rear housing 30 is fixed to a rear end surface 24b of stator core 24, by using a screw, etc. A support ring 32 is fixed to rear housing 30 by using a screw, etc., and support ring 32 supports (an outer race of) rear bearing 14. A rear end 18b of rotation shaft 18 protruding from rear housing 30 is surrounded by a rear cover 34 attached to rear housing 30. Further, an encoder 36 configured to detect the angular position and/or the rotational velocity of rotation shaft 18 is attached to rear end 18b of rotation shaft 18.

Stator 22 has a stator core 24 formed by stacking a plurality of magnetic steel sheets, and a winding wire 38 wound on a protrusion (not shown) formed on an inner surface of stator core 24. Winding wire 38 is fixed to stator core 24 by using resin, etc. Winding wire 38 extends along rotation axis 16 so as to protrude from the both ends of stator core 24, and is connected to a lead line (not shown) which is drawn from a terminal box 40. Winding wire 38 is configured to generate a rotating magnetic field by using current supplied via the lead line, so that rotor 20 is rotated integrally with rotation shaft 18 due to the generated rotating magnetic field.

For example, electric motor 10 may be used while being connected to the spindle of the machine tool. In other words, electric motor 10 may be used in an environment where solids such as dusts and/or fluid such as cleaning liquid or cutting liquid (hereinafter, merely referred to as "foreign material") may scatter or spread. When foreign material enters the inside of the electric motor, insulation failure may occur in the winding wire, and/or the supporting function of the bearing may be deteriorated. Therefore, it is desirable that foreign material be prevented from entering the electric motor.

Thus, in the embodiment, a labyrinth structure is arranged near at least one of front bearing 12 and rear bearing 14 (in the drawing, front bearing 12), so as to prevent foreign material from entering the inside of the electric motor. Concretely, a labyrinth member 42 having a generally annular shape as shown in FIG. 3 is fixed to a portion (e.g., an outer periphery) of rotation shaft 18 positioned on the front side than the front bearing 12 with respect to axis 16, by interference fit, etc., and labyrinth member 42 is configured to rotate integrally with rotation shaft 18.

Figure 3:
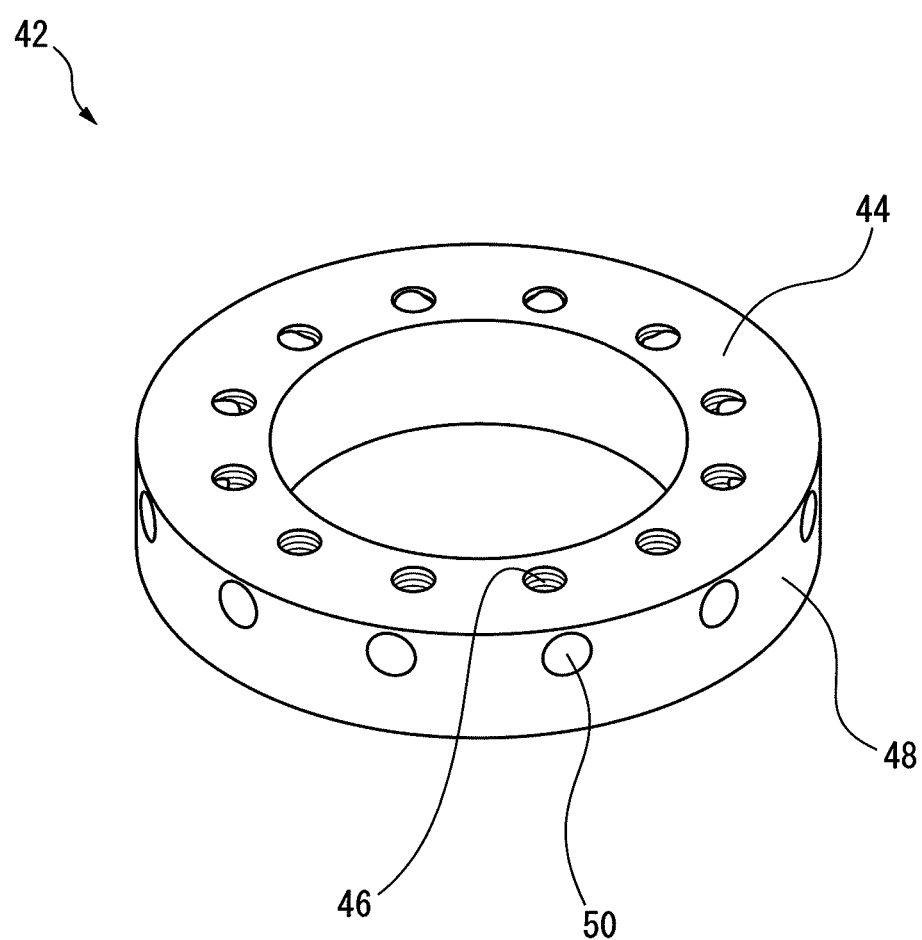
FIG. 3 is an example of a structure of labyrinth member provided to the electric motor of FIG. 1.

As shown in FIGS. 2 and 3, labyrinth member 42 has at least one first opening 46 formed on a front surface (or front end surface) 44 of labyrinth member 42, and at least one second opening 50 formed on an outer lateral surface (or outer periphery) 48 of labyrinth member 42. Further, first opening 46 and second opening 50 are fluidly communicated with each other within labyrinth member 42.

In the embodiment, when labyrinth member 42 is rotated with rotation shaft 18, an air flow as indicated by an arrow 52 is generated by a centrifugal force. The air flow enters first opening 46, flows within labyrinth member 42, and flows out from second opening 50 in the radially outward direction, whereby an air curtain is generated. By virtue of the air curtain, as indicated by an arrow 54, foreign material flowing toward electric motor 10 is deflected toward the outside of electric motor 10 (or in the radially outward direction), without entering the inside of electric motor 10. Therefore, in the embodiment, even if an air-purging device is not used, foreign material can be prevented from entering the inside of the electric motor, by merely forming the hole or opening in or on labyrinth member 42.

In the illustrated embodiment, twelve first openings 46 are formed on front surface 44 of labyrinth member 42, at regular intervals of 30 degrees in the circumferential direction about axis 16, and similarly, twelve (i.e., the same number as the first openings) second openings 50 are formed on front surface 48 of labyrinth member 42, at regular intervals of 30 degrees in the circumferential direction about axis 16. However, the present invention is not limited to this embodiment. For example, on each of front surface 44 and outer lateral surface 48 of labyrinth 42, four openings may be formed at regular intervals of 90 degrees in the circumferential direction, otherwise, six openings may be formed at regular intervals of 60 degrees in the circumferential direction, otherwise, eight openings may be formed at regular intervals of 45 degrees in the circumferential direction. Although the openings may not be formed at regular intervals, it is preferable that the same size of openings be formed at regular intervals, in view of balance or eccentricity due to the rotation of the spindle, etc. Further, as shown in FIG. 3, it is preferable that first opening 46 and second opening 50 be positioned at the same circumferential angular position, and that one first opening is fluidly communicated with one second opening.

Although the shape of each opening may not be the circle as illustrated, it is preferable that each opening has a configuration such as a tapped (threaded) hole or a circular (drilled) hole, which can be easily formed or machined. In the example of FIG. 3, twelve tapped holes extending in the axial direction are formed as first openings 46 on front surface 44 of labyrinth member 42, and twelve drilled holes extending in the inward radial direction are formed as second openings 48 on outer lateral surface 48 at the same angular positions as the tapped holes, so that the drilled holes are fluidly communicated with the tapped holes, respectively. By virtue of this, one flow path from the front surface to the outer lateral surface can be constituted in the labyrinth, merely by forming two simple straight holes.

Herein, the expression "radially outward" means the direction extending away from rotation axis 16 in the transverse section, and the expression "radially inward" means the direction extending toward rotation axis 16 in the transverse section. Further, the expression "axial direction" means a direction parallel to rotation axis 16.

When the labyrinth is to be arranged near rear bearing 14, labyrinth member 42 having the generally ring shape as shown in FIG. 3 is positioned at a portion (e.g., an outer periphery) of rotation shaft 18 positioned at a rear side than rear bearing 14 with respect to axis 16. In this case, at least one first opening 46 is formed on the rear surface (or the rear end surface) of labyrinth member 42. In other words, in either case that labyrinth member 42 is positioned near front bearing 12 or rear bearing 14, labyrinth member 42 is attached to rotation shaft 18 so that first opening(s) 46 is(are) positioned on the end surface axially opposed to the surface facing the inside (i.e., the space where the winding wire, the bearing and the rotor are positioned) of the electric motor.

As described above, the electric motor (or the rotating machine) according to the embodiment has the function for automatically generating the air curtain generated by the centrifugal force due to the rotation, as well as the conventional function for preventing foreign material from entering the motor. Therefore, the electric motor of the embodiment can effectively prevent foreign material from entering the motor. Since it is not necessary to provide an air flow channel or an air supply to the electric motor, a manufacturing cost thereof can be saved. In addition, when the electric motor of the embodiment is applied to a machine tool having a high-speed rotating spindle, such as an NC lathe or machining center, a low-cost and high-security machine tool can be obtained.

According to the present disclosure, the air can enter the first opening, flow within the labyrinth member, and then flow out from the second opening in the radially outward direction, whereby foreign material flowing toward the electric motor is deflected toward the outside of the electric motor, without entering the inside of the electric motor. Therefore, even if an air-purging device, etc., is not used, foreign material can be effectively prevented from entering the inside of the motor.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An electric motor comprising:
   a stator;
   a rotor having a rotation shaft configured to rotate about an axis relative to the stator;
   a front bearing and a rear bearing configured to rotatably support the rotation axis; and
   a labyrinth member attached to at least one of: a portion of the rotation shaft positioned further at a front side than the front bearing with respect to the axis; and a portion of the rotation shaft positioned further at a rear side than the rear bearing with respect to the axis,
   wherein the labyrinth member has: a plurality of first openings formed on an end surface axially opposed to a surface facing an inside of the electric motor; and a plurality of second openings formed on an outer lateral side of the labyrinth member, the second opening being fluidly communicated with the first opening within the labyrinth member,
   and wherein the first opening is a tapped hole.

2. The electric motor as set forth in claim 1, wherein the plurality of first openings are formed at regular intervals with respect to a circumferential direction about the axis, and the plurality of second openings are formed at regular intervals with respect to the circumferential direction about the axis.

3. The electric motor as set forth in claim 1, wherein the number of the first openings is the same as the number of the second openings, and the second openings are positioned at the same circumferential angular position as the first openings.

4. The electric motor as set forth in claim 1, wherein the second opening is a drilled hole.

* * * * *